(12) United States Patent
Eriksson

(10) Patent No.: US 6,446,541 B1
(45) Date of Patent: Sep. 10, 2002

(54) METHOD AND DEVICE FOR JOINTING RODS AND PISTON PUMP INCLUDING THE DEVICE

(75) Inventor: Jan Eriksson, Kista (SE)

(73) Assignee: Atlas Copco Craelius AB, Marsta (SE)

( * ) Notice: Subject to any disclaimer, the term of this patent is extended or adjusted under 35 U.S.C. 154(b) by 0 days.

(21) Appl. No.: 09/622,887

(22) PCT Filed: Feb. 23, 1999

(86) PCT No.: PCT/SE99/00251
§ 371 (c)(1),
(2), (4) Date: Aug. 23, 2000

(87) PCT Pub. No.: WO99/42733
PCT Pub. Date: Aug. 26, 1999

(30) Foreign Application Priority Data

Feb. 23, 1998 (SE) ............................................. 9800525

(51) Int. Cl.$^7$ ................................................. F16D 1/04
(52) U.S. Cl. ........................................ 92/140; 403/367
(58) Field of Search .................. 92/140, 128; 403/367, 403/368, 374.1, 373

(56) References Cited

FOREIGN PATENT DOCUMENTS

| DE | 2630814 | 1/1978 |
|---|---|---|
| DE | 2929859 | 10/1987 |
| GB | 2047834 | 12/1980 |

*Primary Examiner*—Edward K. Look
*Assistant Examiner*—Thomas E. Lazo
(74) *Attorney, Agent, or Firm*—Barnes & Thornburg

(57) ABSTRACT

A device is provided for splicing our joining together two rod-like elements which each have at least one end that shall be joined to a respective end of the other rod-like element, wherein the ends of the two rod-like elements are caused to face one another and are placed adjacent each other.

20 Claims, 5 Drawing Sheets

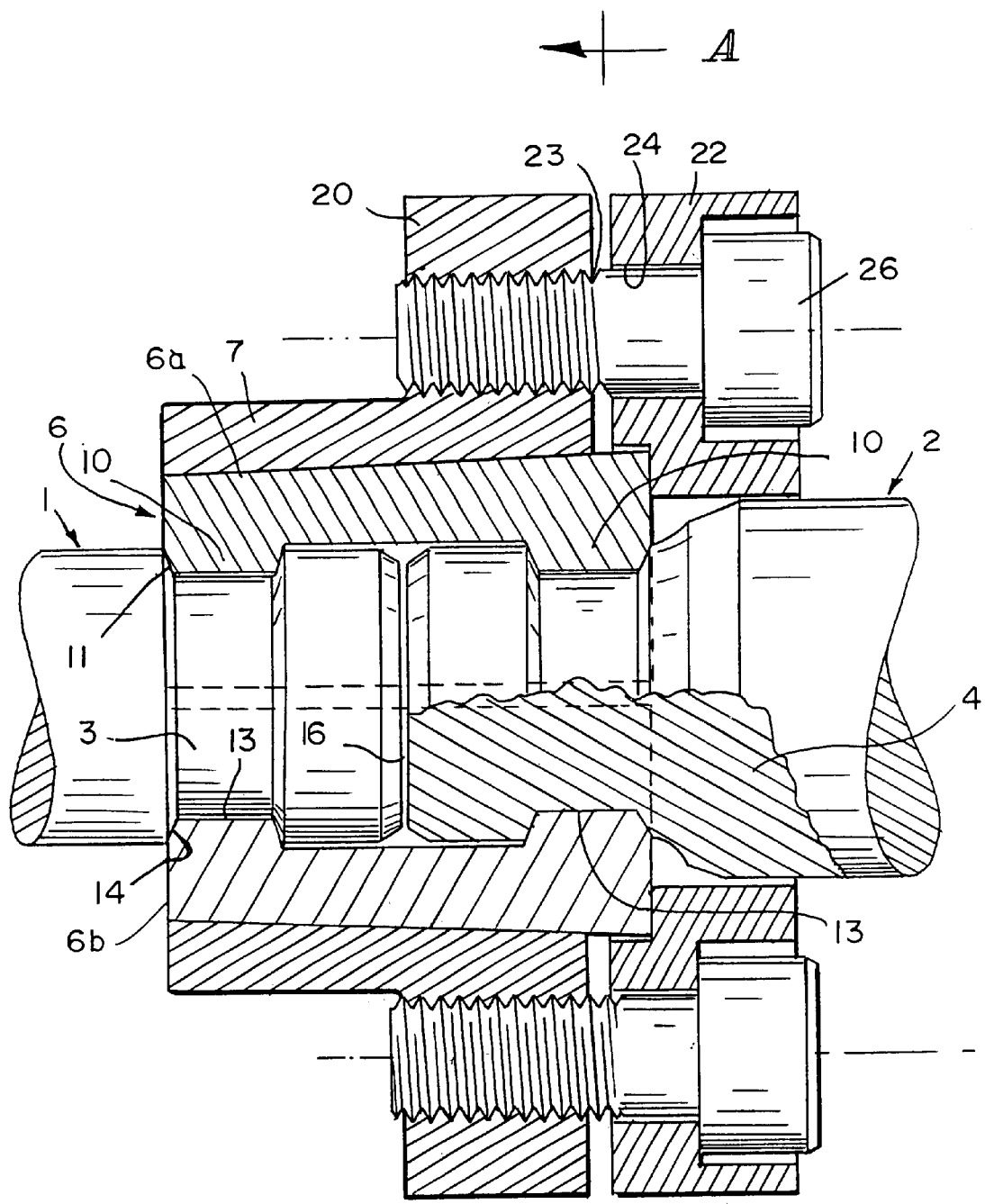

METHOD AND DEVICE FOR JOINTING RODS AND PISTON PUMP INCLUDING THE DEVICE

CROSS-REFERENCES TO RELATED APPLICATIONS

This application is a U.S. national application of international application serial No. PCT/SE99/00251 filed Feb. 23, 1999, which claims priority to Swedish serial No. 9800525-9 filed Feb. 23, 1998.

The present invention relates to a device and to a method for joining together rod-like elements.

The invention also relates to a piston pump.

It is often necessary to join together rod-like elements. In many instances, all that is required is to obtain a rod-like element whose length has been extended both effectively and reliably. In other instances, there is required a joint which will enable a load, or force, to be transferred through the joint and between the rod-like elements joined thereby. Joining of rotating rod-like elements or shafts is an example of this latter case, as is also joining rod-like elements where linear motion shall be transferred between the rod-like elements, e.g. an impact movement. One example of when rod-like elements are joined, or spliced, together and linear movement is required is found in linear motors used to drive various types of machine where uniform reciprocating movement is required with rapid changes in the direction of movement. A double-acting piston pump is one example of such a machine. Double-acting piston pumps are used for pumping different liquids, which may contain solid particles and which are more or less viscous. Examples of areas of use in this latter case are pumping mud and water slurries in different types of ground drill holes, injecting cement and sand into rock, for instance in tunnel driving operations or in the building of power station dams. A piston pump must be able to handle relatively high pressures and must be possible to regulate the pressure and rate of flow in the pump. Furthermore, the piston pump must be reliable in operation, even when the pumped liquid contains particles, for instance comprised of cement and sand or recycled mud that contains drills' cuttings.

In the case of known techniques of establishing a joint between the piston rod-like element of the linear motor and the piston rod-like element of the pump, one of the rod-like elements is provided with an internal thread and the other rod-like element is provided with an external thread and the joint is established by screwing one rod-like element into the other. When this type of joint is used in respect of piston rod-like elements in cement injection pumps, cement will sometimes become baked in and around the pump components, therewith making it difficult to unscrew the rod-like elements and separate the pump from the linear motor. The rod-like elements normally have a small size, in the order of 20–50 mm which causes particular problems. One problem in particular is that the thickness of the material is too small to provide a strong joint, and the threads often give rise to fatigue fractures. Another problem, which is quite usual, is that sand and dirt enter between the threads and therewith lock the screw joint.

The object of the present invention is to provide a method and a device which solves the aforesaid problems and which provides a simpler and more secure rod-like element joint in general and a joint between linear-motor piston rod-like elements and piston pumps in particular.

In accordance with the present invention, a device for joining or splicing together two rod-like element-like elements of which each have at least one end that is to be spliced with a respective end of the other rod-like element and which ends are placed so as to face towards each other and to lie adjacent one another, wherein the device includes an inner sleeve where the distance from the centre of the sleeve to its outer wall decreases in the longitudinal direction of the sleeve, at least along a part of the extension of said sleeve in said longitudinal direction, wherein the inner sleeve is designed to be brought externally over the mutually facing ends of said rod-like elements, wherein the device further includes an outer sleeve where the distance from the centre of the sleeve to the internal wall thereof decreases in the longitudinal direction of the sleeve, at least along a part of the extension of said sleeve in said longitudinal direction, wherein the outer sleeve is designed to be brought externally over the inner sleeve, wherein the outer side of the inner sleeve and the inner side of the outer sleeve are designed to be joined together in a shape-bound manner, wherein the device further includes means for locking the two sleeves relative to one another, and connecting means for lockingly joining the inner sleeve to respective rod-like element ends, wherein the connecting means include recesses and projections which are adapted to connect the inner sleeve with respective rod-like element ends in a shape-bound manner, wherein the recesses have inner sloping abutment sides and the projections have corresponding outer sloping abutment sides, and wherein said inner and outer sloping abutment sides are adapted to lie in mutual abutment such as to provide said connection.

This device provides the advantage of a plain connection, meaning a threadless connection, which is much stronger mechanically than known joints, among other things because joint locking and fatigue fractures are avoided, therewith resulting in a longer useful life, improved economy and generally simpler service. In addition, better force transmission is obtained with the inventive join, since the whole of the splicing device is stiffer, more robust, than known devices. A particular advantage is that a clearance-free connection for axial force transmission is obtained. The device and the elements provided on the ends of the rod-like elements or like elements and forming part of said device are locked in relation to each other in an axial direction.

As before mentioned, the recesses have inner, sloping sides (alternatively they can be described as inclined, angled or conical sides) and the projections have corresponding outer, sloping sides. The inner and outer sloping sides are configured to lie in mutual abutment such as to provide said connection. This implies that the recesses and projections will normally have a general V-shape, although preferably not with a pointed bottom, in other words a shape in which the pointed part of the V has been removed. The top of the projection will also conveniently have a planar surface, which is adapted so as not to reach the bottom of the recess/groove. In this respect, the bottom of the groove may be given a small radius, therewith reducing the danger of fatigue and improving the mechanical strength of the groove. It is also preferred that the sleeve will not abut the outside of the rod-like element and that abutment between the sleeve and the outside of respective rod-like elements will only occur through the medium of the sloping sides of the recesses and projections respectively. These design details are mutually coactive in ensuring contact between the sloping surfaces in the recesses and on the projections, therewith resulting in the advantage of a rigid joint or splice.

In accordance with a particularly beneficial feature and in accordance with the foregoing, the device includes a small clearance between the internal axially extending surface of the inner sleeve and the externally and axially extending surface of the ends of respective rod-like elements, so that abutment between the inner sleeve and respective ends of said rod-like elements can only be achieved through the medium of said sloping abutment sides of respective projections and recesses.

Another beneficial feature of the invention is that the two sleeves are locked relative to one another by means of a wedging action.

In one preferred embodiment, a small clearance remains between the ends of the rod-like elements when said rod-like elements are in position in the inner sleeve of the rod-like element-splicing device. This clearance will preferably be in the order of 0.5–0.8 mm. The advantage with this clearance is that forces will not be transferred between the spliced ends of the rod-like elements per se, but via the sleeves.

The inventive method is characterized in that in the event of linear movement between the spliced rod-like elements, the forces involved are transmitted, or transferred, via the sloping abutment surfaces provided on the inside of the inner sleeve and the corresponding sloping abutment surfaces provided on the outside of respective rod-like element-ends, these mutually abutting surfaces providing a shape-bound connection. According to a further beneficial feature of the invention, the inner sleeve and the rod-like element-ends are locked relative to one another in the axial direction.

According to a first embodiment, the connecting devices included recesses that extend circumferentially around the rod-like elements to the joined, close to their respective ends, wherein the connecting devices are further characterized in that they include projections on the inside of the inner sleeve, said projections and recesses being adapted to provide a shape-bound connection. According to an alternative embodiment, the connection devices include projections on the circumferential surface of respective rod-like elements, close to respective ends of said rod-like elements, and recesses on the inside of the inner sleeve, said projections and recesses being adapted to provide a shape-bound connection. The projections will conveniently have the form of projections that extend transversely to the longitudinal axis of the inner sleeve and which also extend inwardly within the inner sleeve. Alternatively, the projections may extend transversely to the longitudinal axis of respective rod-like elements on respective rod-like element ends. The projections will conveniently have the form of radial projections. The recesses will preferably have the form of grooves that extend transversely to the longitudinal direction of the inner sleeve and respective rod-like elements. The grooves, or recesses, will conveniently be radial grooves. The internal geometrical design of the rod-like elements and the inner sleeve must, of course, be mutually adapted. Thus, it is not necessary for the rod-like elements to have a circular cross-sectional shape, and neither is it necessary for the interior of the inner sleeve to have a circular cross-section, but may have a rectangular cross-section, for instance.

In one particularly preferred embodiment, the inner sleeve is divided into at least two parts, preferably two halves. This enables the inner sleeve to be fitted readily over the join ends and also contributes in achieving positive contact between the sloping surfaces of the recesses and of the projections, in the same way as that described above.

Locking of the two sleeves, which thus lie in abutment with one another, is achieved with the aid of locking means which, in turn, conveniently include a counterpressure element adapted for abutment with that end of the inner sleeve at which the distance from the centre of the sleeve to its outer wall is greatest. The locking means also include a locking element on the outer sleeve, said locking element conveniently including a perforated flange. The counterpressure element also includes a perforated flange and the locking means also includes screws that are screwed into said holes, so as to form a screw joint, which constitutes said locking means. Tightening of the screws will thus draw, the counterpressure element into contact with the outer sleeve while, at the same time, pressing the inner sleeve in one direction as the outer sleeve is acted upon by the screw tension in the opposite direction, therewith achieving an effective wedging action between the two sleeves. The inner sleeve is conveniently configured so as to have a generally conical outer surface, and the outer sleeve is conveniently configured so as to have a generally conical inner surface, said surfaces being configured for shape-bound coaction.

Naturally, respective outer surfaces and inner surfaces may have some other configuration, for instance a rectangular or triangular cross-sectional shape. Finally, in respect of the screw joint, the outer surface of the outer sleeve may have any suitable form. The number of screws required may vary, as desired. Neither is there any necessary relationship between the internal and external shape of respective sleeves.

As before mentioned, the invention is particular suitable for application with a piston pump. The piston pump will be of a kind that preferably includes a cylinder that has a front and a rear cylinder wall, and a piston that is reciprocatingly moveable in the cylinder and fastened to a piston rod that passes through one of the cylinder walls, and a linear motor that has an outwardly extending rod-like element for driving the piston pump. The piston rod of the piston pump is spliced, or joined, to the outwardly extending rod-like element of the linear motor by means of the inventive device described afore.

The present invention will now be described in more detail with reference to exemplifying embodiments thereof and also with reference to the accompanying drawings, in which FIG. 1 is a partially sectioned side view of a first embodiment of the invention;

Figure 2:
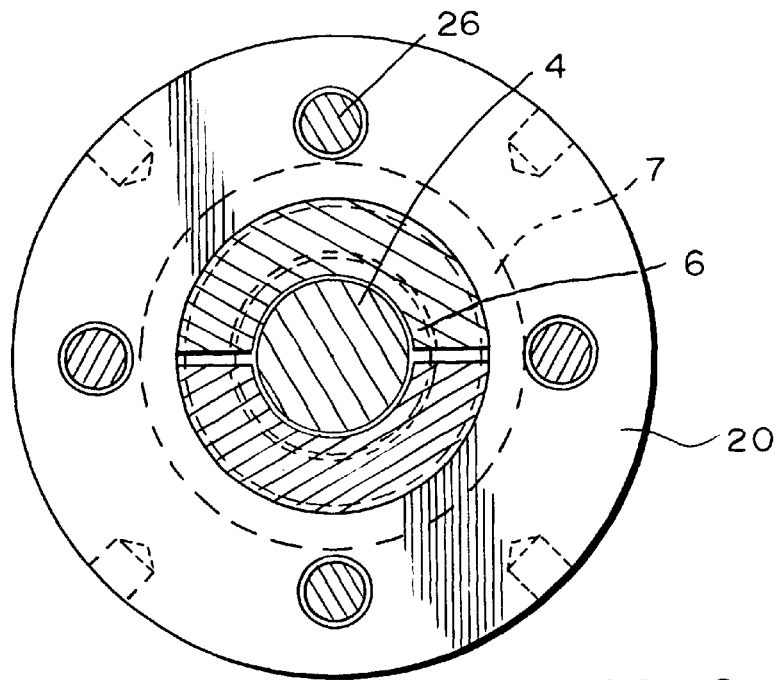
FIG. 2 is a cross-sectional view of a first embodiment of the invention taken on the line A—A in FIG. 1 in a plane perpendicular to the plane in FIG. 1.

The first embodiment of the inventive device illustrated in FIGS. 1 and 2 is used to splice together two rod-like elements 1, 2. The rod-like element 1 has an end 3 and the rod-like element 2 has an end 4 and the rod-like elements shall be spliced or joined together with said ends facing one another within the splicing device. The splicing device includes an inner sleeve 6, which in the illustrated case has a conical outer shape, and an outer sleeve 7, which in the illustrated case has a conical internal shape. As shown, these two conical surfaces lie in abutment with one another. The inner sleeve includes projections 10 disposed on the inner surface of said sleeve and extending radially inwards therein. The projections have oblique edges 11. The inner sleeve 6 includes two arrays of such projections, one for a respective end of each rod-like element, which are intended to engage respective ends of the rod-like elements. Correspondingly, respective ends of the rod-like elements include recesses 13 in the form of circumferentially extending grooves having oblique sides 14. The grooves 13 have the shape of a flat-bottomed V. The sides 11 of the projections and the sides 14 of the grooves lie in abutment with one another. As will be understood, the projections do not reach the bottoms of respective grooves. Neither do the inner surfaces of the sleeves in general lie against the outer surface of any of the rod-like elements. There is preferably a small gap 16 between the mutually facing ends of the rod-like elements, so as to provide a clearance in the order of 0.5–0.8 mm between said ends.

The sleeve 7 includes a collar or flange 20. At that end of the inner sleeve which has the largest cross-sectional size, i.e. that end of the inner sleeve where the distance from the centre of the sleeve to its outer wall is greatest, there is provided a counterpressure element 22. The flange 20 on the sleeve 7 and the counterpressure element, or anvil flange 22, both include respective holes 23 and 24 in which a screw 26 is inserted. The hole 23 has an internal thread and the screw 26 a corresponding outer thread. A screw joint is thus established when tightening the screw, such as to cause the counterpressure flange 22 to press the inner sleeve to the left in the Figure at the same time as the outer sleeve 7 is subjected to a pulling force in the opposite direction. This results in a wedging action, which locks the two sleeves in relation to one another in an effective and simple manner. This solution also enables the rod-like elements to be readily disconnected from one another, as opposed to known splicing techniques.

As an alternative to providing the flange 20 with an internal thread, the hole may, of course, be smooth on the inside and the screw fastened to the rear side of the flange 20 with a nut. Other types of locking means are also feasible, for instance different types of clamping means.

As evident from FIG. 1, the sleeve 6 is preferably divided into two halves 6a and 6b. These sleeve halves will preferably be spaced slightly apart as opposed to being in contact with one another, so as to ensure contact between the sloping surfaces in the grooves and on the projections respectively.

Figure 3:
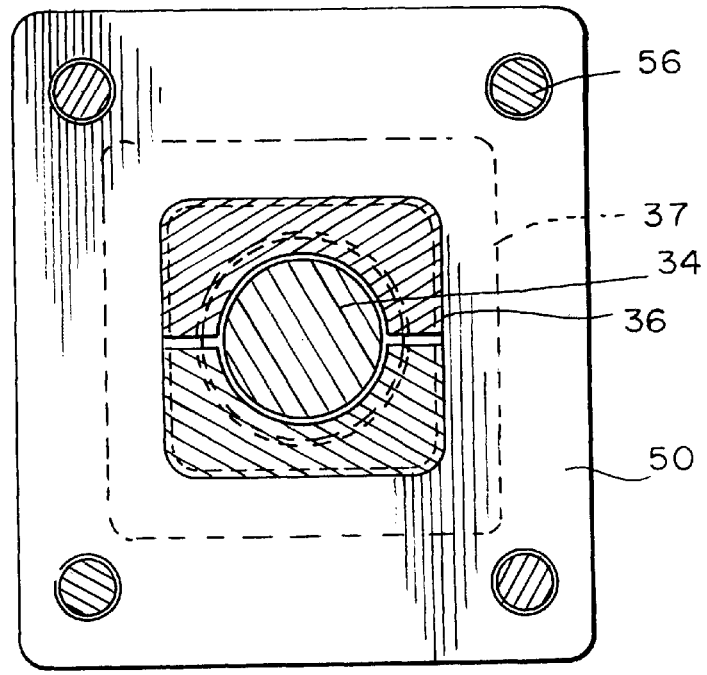
FIG. 3 is a cross-sectional view corresponding to FIG. 2 but illustrating a second embodiment of the invention.

FIG. 3 illustrates a second embodiment of a splicing device where the outside of the inner sleeve 36 and the inside of the outer sleeve 37 are rectangular in shape, seen in a cross-sectional view. The outside of the outer sleeve is also rectangular in shape. In this embodiment, it has been found appropriate to place the screws 56 of the screw joint in respective corners of respective flanges 50. Such an arrangement may be necessary for space reasons, for instance. Although the rod-like element 34 is shown to have a circular cross-section, it may, of course, conceivably have some other cross-sectional shape. The FIG. 3 embodiment functions in other respects in the same way as the embodiment illustrated in FIGS. 1 and 2.

Figure 4:
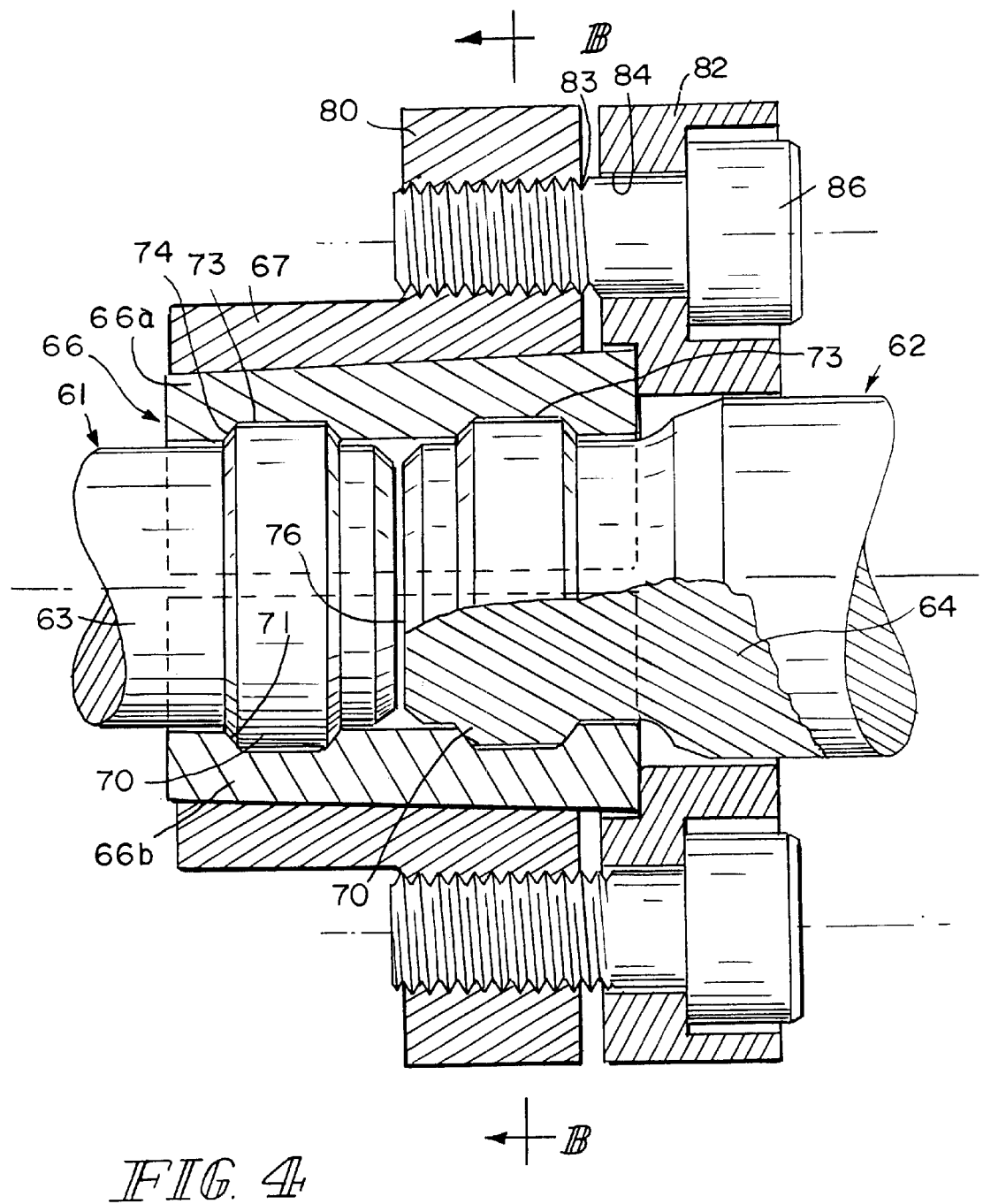
FIG. 4 is a partially sectioned side view of a third embodiment of the invention.
Figure 5:
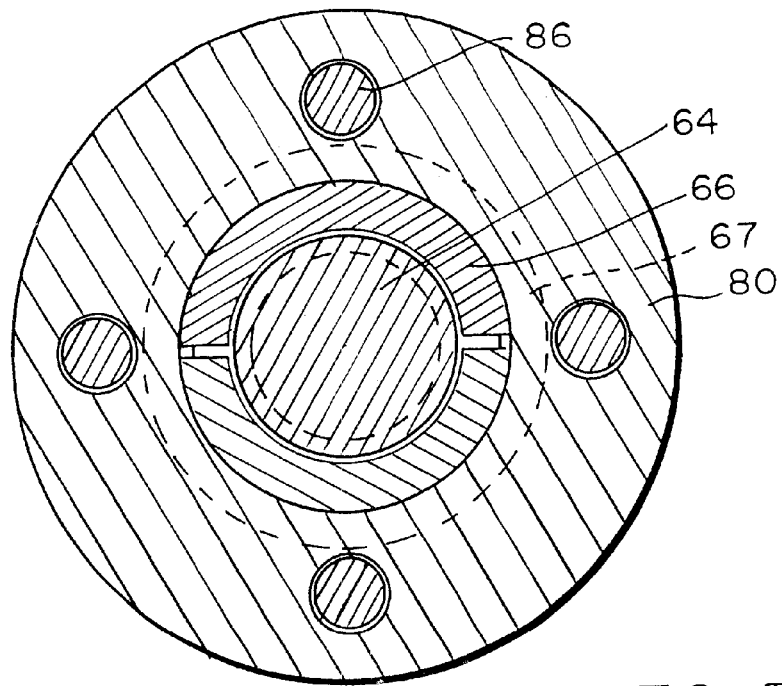
FIG. 5 is a sectional view of said third embodiment taken on the line B—B in FIG. 1 in a plane perpendicular to the plane in FIG. 4.

FIGS. 4 and 5 illustrate a third embodiment in which the projections are provided on the ends of respective rod-like elements instead of on the inner sleeve. The recesses are thus provided on the inside of the inner sleeve instead of on the ends of the rod-like elements. FIGS. 4 and 5 thus show two rod-like elements 61, 62 having respective ends 63, 64 on which ring-shaped projections 70 are provided. These projections have oblique edges 71. The inner sleeve 66 includes two arrays of corresponding recesses, in the form of ring-shaped grooves 73 having oblique sides 74. In other respects, the various components are designed in the same way or in a corresponding way as the components of the FIG. 1 embodiment and operate in a similar manner. Thus, the device also includes an outer sleeve 67 having a flange 80, a counterpressure or anvil means 82, which are provided with respective holes 83 and 84, and screws 86, these components together forming a screw joint. There is also a small clearance 76 between the opposing end surfaces of the rod-like elements. As evident from FIG. 5, the outer sleeve also has a circular shape.

Figure 6:
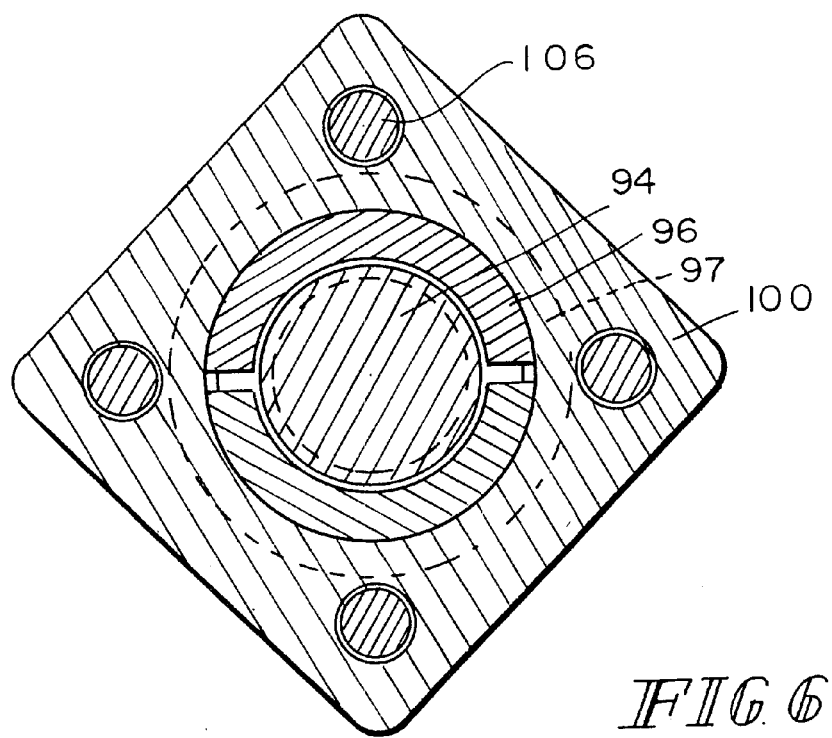
FIG. 6 is a sectional view corresponding to the view in FIG. 5 but showing a variant of said third embodiment.

FIG. 6 illustrates a variant of the third embodiment shown in FIG. 4. The sole difference between the variant and the embodiment illustrated in FIGS. 4 and 5 is that the outer sleeve of said variant has a rectangular outer shape, and is meant to illustrate by example how the shapes of the component parts can be varied within the scope of the inventive concept. Thus, in the illustrated case, an inner sleeve 96 and an outer sleeve 97 embrace one end 94 of a rod-like element. The outer sleeve is provided with a flange 100 that includes holes for receiving screws 106, such as to establish a screw joint.

The preferred embodiments of the invention described above are intended solely as illustrative examples without limiting the scope of the inventions. It will be understood that these embodiments can be modified within the scope of the inventive concept as defined in the following claims. For instance, it is not necessary for the projections in the inner sleeve or the recesses in the ends of respective rod-like elements to extend continuously around the full circumference or perimeter and that they may have the form of several discrete and separate recesses/projections around said periphery or perimeter. Neither are the external shapes restricted to any particular recess or projection configuration on the ends of said rod-like element or the inner sleeve. The number of screws used in the screw joint may also vary, and so on.

It will also be noted that the invention is not restricted to splicing the piston rod of a linear motor to a corresponding rod of a piston pump, and that all other applications where the need for such splicing or joining devices exist are also feasible. It will also be noted in particular that the splicing device is in no way limited to rod-like elements of small diameter and that said device can be used to splice together rod-like elements of much larger and greatly varying diameters.

Figure 7:
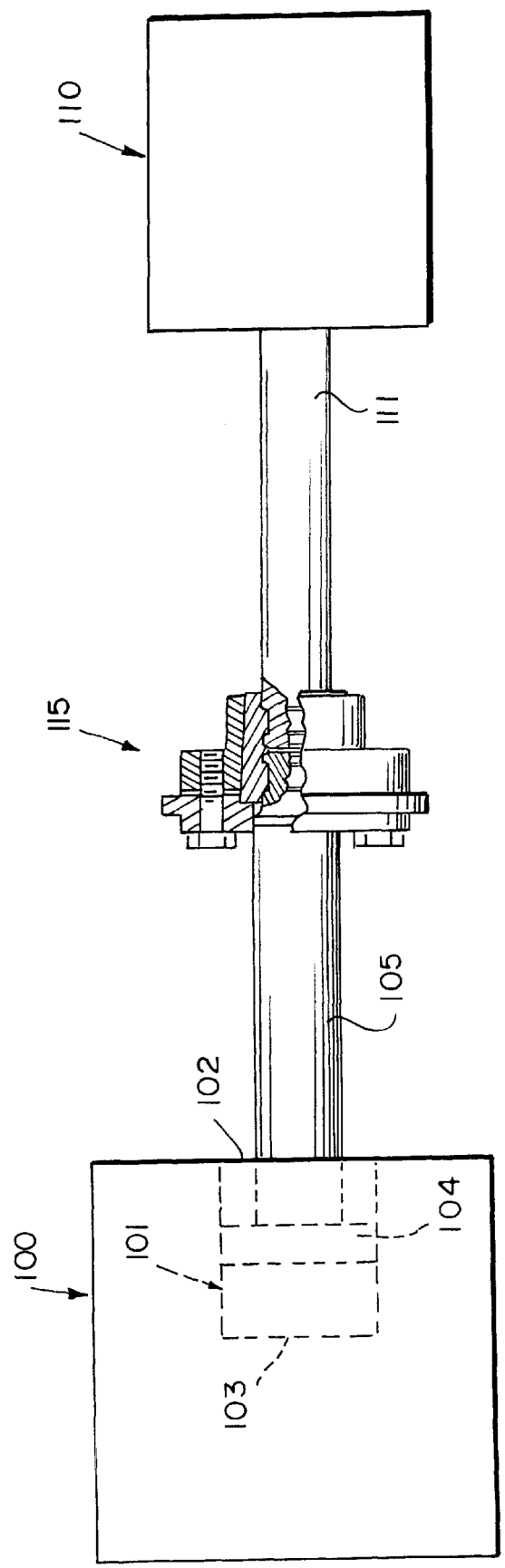
FIG. 7 is a side view of an embodiment corresponding to that shown in FIG. 1, however, it could be exchanged for the embodiment shown in FIG. 2.

As shown in FIG. 7, a piston pump 100 includes a cylinder 101 having a front wall 102 and a rear wall 103, and a piston 104, which is reciprocatingly moveable in the cylinder 101 and which is attached to a piston rod 105 that extends through one of the cylinder 101 walls. A linear motor 110 has an outwardly extending rod-like element 111 for driving the piston pump 100, the piston pump 100 including a device 115 for joining the piston rod 105 of the pump 100 with the outgoing rod-like element 111 of the linear motor 110.

What is claimed is:

1. A device for joining together two rod-like elements of which each has at least one end that shall be joined to a respective end of the other rod-like element, said two ends being placed adjacent one another so as to mutually face each other, wherein the device includes an inner sleeve where the distance from the center of said inner sleeve to its outer wall decreases in the direction of the long axis of said inner sleeve, at least along a part of the extension of said inner sleeve in said longitudinal direction, wherein the inner sleeve is adapted to be fitted externally over the mutually facing rod-like element-ends, wherein the device further includes an outer sleeve where the distance from the center of said outer sleeve to its inner wall decreases in the longitudinal direction of the outer sleeve, at least along a part of the extension of said outer sleeve in said longitudinal direction, wherein the outer sleeve is adapted to be fitted externally over the inner sleeve, wherein the outside of the inner sleeve and the inside of the outer sleeve are configured to achieve a shape-bound connection with each other, wherein the device further includes locking means for locking the two sleeves in relation to one another, and wherein said device also includes connecting means for locking connection of the inner sleeve with respective ends of the rod-like elements, wherein the connecting means comprise recesses and projections, said projections and recesses are configured for shape-bound connection of the inner sleeve with the ends of respective rod-like elements, the recesses have inner sloping abutment sides and the projections have corresponding outer, sloping abutment sides, and said inner and outer sloping abutment sides are configured to abut one another and therewith establish said connection.

2. The device according to claim 1 further including a small clearance between the inner, axially extending surfaces of the inner sleeve and the outer, axially extending surfaces of the ends of the rod-like elements so that abutment between the inner sleeve and the ends of respective rod-like elements can only take place via said sloping abutment sides of respective projections and recesses.

3. The device according to claim 1 wherein the two sleeves are locked in relation to each other through the medium of a wedging action.

4. The device according to claim 1 further including a small clearance between the ends of the rod-like element when said ends are located within the inner sleeve of the joining device.

5. The device according to claim 1 wherein the connecting means include recesses in the perimeter surface of respective rod-like elements close to their respective ends and wherein the connecting means also include projections on the inside of the inner sleeve, said recesses and projections being adapted to provide a shape-bound connection.

6. The device according to claim 1 wherein the connecting means include projections on the perimeter surface of respective rod-like elements close to respective ends and wherein the connecting means further include recesses on the inside of the inner sleeve, said projections and recesses being adapted to provide a shape-bound connection.

7. The device according to claim 1 wherein the projections extend inwardly in the inner sleeve transversely to the longitudinal direction of said inner sleeve.

8. The device according to claim 1 wherein the projections have the form of projections on the ends of respective rod-like elements that extend transversely to the longitudinal direction of the respective rod-like elements.

9. The device according to claim 1 wherein the recesses have the form of grooves which extend transversely to the longitudinal direction of the inner sleeve and respective rod-like elements.

10. The device according to claim 1 wherein the inner sleeve is divided into at least two sleeve parts in its axial direction.

11. The device according to claim 1 wherein the locking means include a counterpressure element adapted for abutment with that end of the inner sleeve at which the distance from the center of the sleeve to the outer wall thereof is greatest.

12. The device according to claim 1 wherein the locking means includes a locking element on the outer sleeve.

13. The device according to claim 12 wherein the locking element includes a flange provided with holes, wherein the counterpressure element includes a flange provided with holes, and wherein the locking means also includes screws for insertion into said holes such as to form a screw joint which constitutes said locking means.

14. The device according to claim 1 wherein the inner sleeve has an essentially conical outer surface and wherein the outer sleeve has an essentially conical inner surface.

15. A piston pump which includes a cylinder having a front and a rear wall, and a piston which is reciprocatingly moveable in the cylinder and which is attached to a piston rod that extends through one of the cylinder walls, and including a linear motor that has an outwardly extending rod-like element for driving the piston pump, the piston pump including a device for joining the piston rod of said pump with the outgoing rod-like element of the linear motor in accordance with claim 1.

16. A method of joining together two rod-like elements each of which has at least one end that is to be joined to a respective end of the other rod-like element, wherein said two ends are placed so as to face one another and lie adjacent to one another, wherein an inner sleeve where the distance from the center of the sleeve to its outer wall decreases in the longitudinal direction of said sleeve, at least along a part of the extension of said sleeve in said longitudinal direction, is placed externally over the mutually facing ends of said rod-like elements, wherein an outer sleeve where the distance from the center of the sleeve to its internal wall decreases in the longitudinal direction of the sleeve, at least along a part of the extension of said sleeve in said longitudinal direction, is placed externally over the inner sleeve, wherein the outer surface of the inner sleeve and the inner surface of the outer sleeve are adapted for shape-bound connection with one another, wherein said sleeves are locked together by means of locking means, and wherein, in the event of linear movement between said spliced rod-like elements, forces are transmitted through the medium of sloping abutment surfaces on the inner surface of the inner sleeve, said abutment surfaces lying in abutment with corresponding sloping abutment surfaces provided on the outside of the ends of respective rod-like elements, such as to provide a shape-bound connection.

17. A method according to claim 16, characterized by locking the inner sleeve (6; 36; 66; 96) and the rod-like element-ends (3, 4; 34; 63, 64; 94) axially in relation to each other.

18. A method according to any one of the preceding claims, characterized by locking the sleeves (6, 7; 36, 37; 66, 67; 96, 97) together through the medium of a wedging action.

19. A method according to any one of the preceding claims, characterized by providing a small clearance (16; 76) between the rod-like element-ends (3, 4; 34; 63, 64; 94) when said ends are located within the inner sleeve (6; 36; 66; 96) of the joining device.

20. The method according to claim 16 further including bringing a counterpressure element forming a part of said locking means into abutment with that end of the inner sleeve at which the distance from the center of said sleeve to its outer wall is greatest; and connecting said counterpressure element to flange means on said outer sleeve with screws such as to form a screw joint which constitutes said locking means, wherewith the locking means is tensioned by tightening the screws in the screw joint.

* * * * *